United States Patent
Green et al.

(10) Patent No.: US 6,496,881 B1
(45) Date of Patent: Dec. 17, 2002

(54) METHOD AND APPARATUS FOR DISABLING A PROCESSOR IN A MULTIPROCESSOR COMPUTER

(75) Inventors: Alan M. Green, Houston, TX (US); Jim H. Kuo, Houston, TX (US); Jeoff M. Krontz, Houston, TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/266,506

(22) Filed: Mar. 11, 1999

(51) Int. Cl.[7] .............................. G06F 13/10; G06F 1/18
(52) U.S. Cl. ......................... 710/58; 710/59; 713/322; 713/330; 713/502; 714/10; 714/22; 714/23; 714/24
(58) Field of Search ..................... 710/58, 59; 713/502, 713/322, 330, 2; 714/1, 10, 22, 23, 24

(56) References Cited

U.S. PATENT DOCUMENTS

| | | | |
|---|---|---|---|
| 5,465,360 A | | 11/1995 | Miller et al. ................. 395/700 |
| 5,491,788 A | * | 2/1996 | Cepulis et al. .......... 395/182.11 |
| 5,497,497 A | | 3/1996 | Miller et al. ................. 395/800 |
| 5,535,395 A | | 7/1996 | Tipley et al. ................. 395/729 |
| 5,568,641 A | * | 10/1996 | Nelson et al. ............... 395/700 |
| 5,611,078 A | | 3/1997 | Miller et al. ................. 395/653 |
| 5,627,962 A | | 5/1997 | Goodrum et al. ....... 395/182.11 |
| 5,659,748 A | * | 8/1997 | Kennedy .................... 395/652 |
| 5,724,527 A | * | 3/1998 | Karnik et al. ............... 395/308 |
| 5,729,675 A | | 3/1998 | Miller et al. ............ 395/183.12 |
| 5,737,604 A | | 4/1998 | Miller et al. ................. 395/651 |
| 5,737,615 A | * | 4/1998 | Tetrick ................... 395/750.06 |
| 5,761,518 A | | 6/1998 | Boehling et al. ............ 395/821 |
| 5,870,602 A | | 2/1999 | Miller et al. ................. 395/651 |
| 6,058,475 A | * | 5/2000 | McDonald et al. ............ 713/2 |
| 6,122,735 A | * | 9/2000 | Steiert et al. .................... 713/2 |
| 6,308,285 B1 | * | 10/2001 | Bowers ........................ 714/10 |

FOREIGN PATENT DOCUMENTS

| | | | | |
|---|---|---|---|---|
| JP | 401051562 A | * | 2/1989 | ............ G06F/15/16 |
| JP | 403209533 A | * | 9/1991 | ............ G06F/11/20 |

OTHER PUBLICATIONS

*Hive: Fault Containment for Shared–Memory Multiprocessors*, John Chapin et al., ©1995 Association for Computing Machinery, Inc.

*A Conceptual Framework for System Fault Tolerance*, National Institute of Standards and Technology, Mar. 30, 1995.

\* cited by examiner

Primary Examiner—Jeffrey Gaffin
Assistant Examiner—Rehana Perveen
(74) Attorney, Agent, or Firm—Akin Gump Strauss Hauer & Feld LLP

(57) ABSTRACT

A multiprocessor computer includes a processor disabling scheme which disables a processor that has been designated to boot the computer but fails to boot the computer. For computers having voltage regulator modules (VRMs) to power each processor, a control device directs a VRM associated with the failed boot processor to cease supplying power in response to the processor's failure. For computers without VRMs, a transistor controls the delivery of power from the power supply to each respective processor. If a designated boot processor fails to boot the system, the control device turns off the appropriate transistor to disable the failed processor.

25 Claims, 5 Drawing Sheets

METHOD AND APPARATUS FOR DISABLING A PROCESSOR IN A MULTIPROCESSOR COMPUTER

BACKGROUND OF THE INVENTION

1. Field of the Invention

The present invention relates generally to computer systems and, more particularly, to methods and apparatus for disabling a processor in a multiprocessor computer.

2. Description of the Related Art

About two decades ago, a relatively compact and basic computing device, which would come to be known as the personal computer or PC, was under development. Like all personal computers since, these early personal computers utilized microprocessors coupled to various types of memory devices. However, due to the extremely limited computing capabilities of these early microprocessors and the limited size and costliness of high speed memory, these early personal computers truly were nothing but stand alone personal computing devices.

In the intervening years, microprocessors, memory devices, software, and many other portions of a computing system have seen rapid improvements in speed, capacity, complexity, and performance. By way of example, the latest generation microprocessors from Intel Corporation include the Pentium, Pentium Pro, and Pentium II Xeon (Slot-2) microprocessors. These processors are so powerful that they not only would have been considered an unbelievable evolution over the Z80 and 8080 microprocessors of two decades ago, but they also offer significant enhancements over the prior generation 486 processors. Even in view of this rapid and incredible improvement of microprocessors, the resource requirements of software are always increasing, as are the variety of uses for "personal" computers. These needs, in turn, drive the need for the design and development of ever more powerful and efficient computer systems.

In view of these vast technological improvements, personal computers have made great strides from their humble beginnings to provide solutions for the ever expanding needs and desires of the computing public. For example, two decades ago, virtually all large or complicated computing operations, from data processing to telephone networks, were handled by large mainframe computers. However, networks of microprocessor-based personal computers have made tremendous inroads into areas that were once the exclusive domain of such large mainframe computers. Such networks of personal computers provide the computing power and centralized access to data of mainframe systems, along with the distributed computing capability of stand alone personal computers. These networks typically include tens, hundreds, or even thousands of personal computers, including powerful personal computers that can act as servers. Indeed, as such networks have become larger and more complex, there has been a need for improving the computing performance of servers on the network. To address this need, multiple processors are now being used in personal computers which are configured to act as servers in order to produce more powerful servers.

The expansion of microprocessor-based personal computers into the mainframe domain, however, has not been problem free. Mainframe computers have historically been designed to be reliable and extremely fault tolerant. In other words, a failure of a portion of the mainframe computer does not typically result in lost or corrupted data or extensive down time. Because personal computer networks are increasingly being used instead of mainframe systems, users are demanding that such networks provide fault tolerance similar to that found in the mainframe systems.

In view of these user demands, manufacturers have devised various ways for providing fault tolerance in personal computer networks. Many of these developments have concentrated on the fault tolerance of the servers in a personal computer network, because servers are typically the cornerstone of most networks. In other words, because the servers typically provide applications, data, and communications among the various workstations, the failure of one server could cause the entire network to fail.

In a multiprocessor computer such as those typically used as servers, one problem that may occur involves the failure of one of the multiple processors. Because of this possibility, a fault-tolerant scheme should include the ability to detect when one of the multiple processors has failed. Current fault detection schemes of this type typically attempt to determine whether a processor has failed during the power up sequence. For example, one method of booting a multiprocessor computer involves the assignment of a primary processor, typically called a boot processor, which is responsible for activating the remainder of the computer system. Once the boot processor has been successfully started, the boot processor then tests the remaining processors and various other components in the computer system. While this scheme facilitates the detection of a failed secondary microprocessor, it does not address a situation where the boot microprocessor fails. In such a situation, the boot microprocessor would be unable to activate the secondary processors, leaving the entire server incapacitated even though one or more secondary processors may remain fully operational.

In an effort to address this problem, one technique utilizes a timer associated with the processors, along with specialized hardware to determine the hierarchy of the multiple processors. When the system is reset, the boot processor is initialized by the hardware and activated to boot the remainder of the computer system including the secondary processors. However, if the boot processor does not take certain actions within the period set by the timer, the timer expires and sends a signal to the hardware to cause the hierarchy of the multiple processors to be changed. Thus, one of the secondary processors becomes the boot processor, and it attempts to activate the computer system. This process, which is typically referred to as a hot spare boot, continues until a successful boot operation occurs.

Although this type of technique may be quite satisfactory in many circumstances, shortcomings do exist. Of primary concern is the method conventionally used to exclude a processor from the boot process. Currently, the "FLUSH#" pin on the processor is asserted during a reset to cause a failed processor to shut itself off. After a reset, when the processor samples this pin and determines that the FLUSH# signal has been asserted, the processor's pins are placed in a high impedance state or tristate mode so that the processor "plays dead" during the rest of the system's normal operations. While this method appears to be quite satisfactory, as mentioned above, the inventors have questioned the reliability of this method if the processor has internal failures. For instance, a failing processor may not be able to sample the FLUSH# pin, and, if it can, it may not be able to operate properly to remove itself from operation. Thus, a problem with this conventional method is that it relies on a failing processor to (a) interpret an incoming signal and (b) to perform the appropriate action to remove itself from operation.

The present invention may address one or more of the problems set forth above.

SUMMARY OF THE INVENTION

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In one embodiment, a computer has a plurality of processors, each of which are powered by a respective voltage regulator module (VRM). During a power on sequence, one of the processors is designated as a boot processor, which is responsible for booting the remaining processors. If the boot processor is operating correctly, it delivers a signal to stop an associated timer, and it boots the computer. However, if the boot processor is not able to boot the computer, the computer resets itself. Specifically, in this embodiment, the timer associated with the boot processor times out and delivers a signal to control logic if the boot processor does not boot the computer within a given time period. In response to this signal, the control logic delivers a signal to the VRM associated with the boot processor. The signal causes the VRM to discontinue supplying power to the boot processor, thus disabling the boot processor. This process may continue until one of the processors successfully boots the computer.

In another embodiment, a computer has a plurality of processors, each of which are powered by the computer's power supply via a respective transistor. During a power on sequence, one of the processors is designated as a boot processor, which is responsible for booting the remaining processors. If the boot processor is operating correctly, it delivers a signal to stop an associated timer, and it boots the computer. However, if the boot processor is not able to boot the computer, the computer resets itself. Specifically, in this embodiment, the timer associated with the boot processor times out and delivers a signal to control logic if the boot processor does not boot the computer within a given time period. In response to this signal, the control logic delivers a signal to the transistor associated with the boot processor. The signal turns off the transistor to discontinue the supply of power to the boot processor, thus disabling the boot processor. This process may continue until one of the processors successfully boots the computer.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
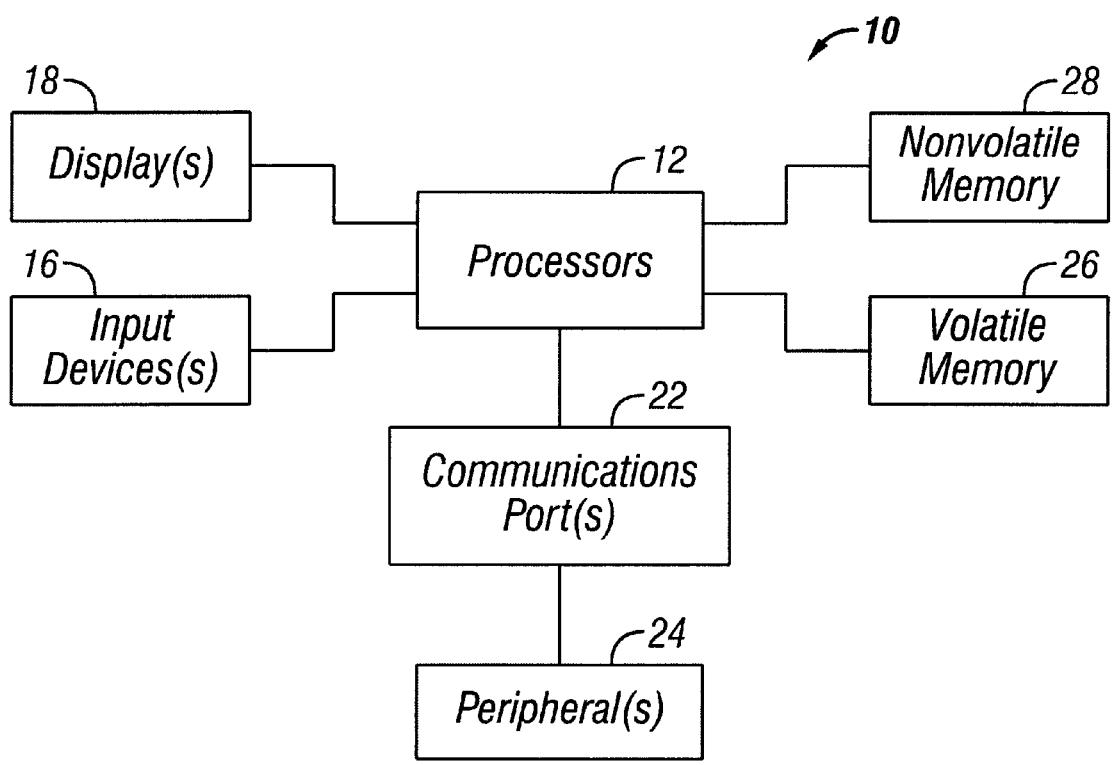
FIG. 1 illustrates a block diagram of an exemplary multiprocessor computer system.

Turning now to the drawings, and referring initially to FIG. 1, a block diagram depicting a multiprocessor computer system, generally designated by the reference numeral 10, is illustrated. In this embodiment of the system 10, multiple processors 12, such as microprocessors, control many of the functions of the system 10. In one particular embodiment, the processors 12 may be, for example, Pentium, Pentium Pro, or Pentium II Xeon (Slot-2) processors available from Intel Corporation.

Various other devices may be coupled to the processors 12, depending upon the functions that the system 10 performs. For instance, the system 10 may include various input devices. The input devices may include user interfaces such as a keyboard, a mouse, and/or a voice recognition system, for instance. The system 10 may also include a display 18. The display 18 may include a CRT, a flat panel display, LEDs, and/or an audio system, for instance.

A communications port 22, such as a network interface card for example, may also be coupled to the processors 12. The communications port 22 may be coupled to one or more peripheral devices 24. Such peripheral devices 24 may include a modem, a printer, and/or a scanner, for instance. Of course, the peripheral devices 24 may also include additional computers, as the computer system 10 may act as a server in a computer network that includes multiple computers and other peripheral devices.

Because the processors 12 control the functioning of the system 10 generally under the control of software programming, memory is coupled to the processors 12 to store and to facilitate execution of these programs. For instance, the processors 12 may be coupled to volatile memory 26, which may include dynamic random access memory (DRAM) and/or static random access memory (SRAM). In addition, the processors 12 may be coupled to nonvolatile memory 28, which may include read only memory, a hard drive, and/or flash memory. Typically, the size of the nonvolatile memory 28 is selected to be large enough to store any necessary operating system, certain application programs, and fixed data, while the volatile memory 26 may be quite large so that it may store dynamically loaded applications.

Figure 2:
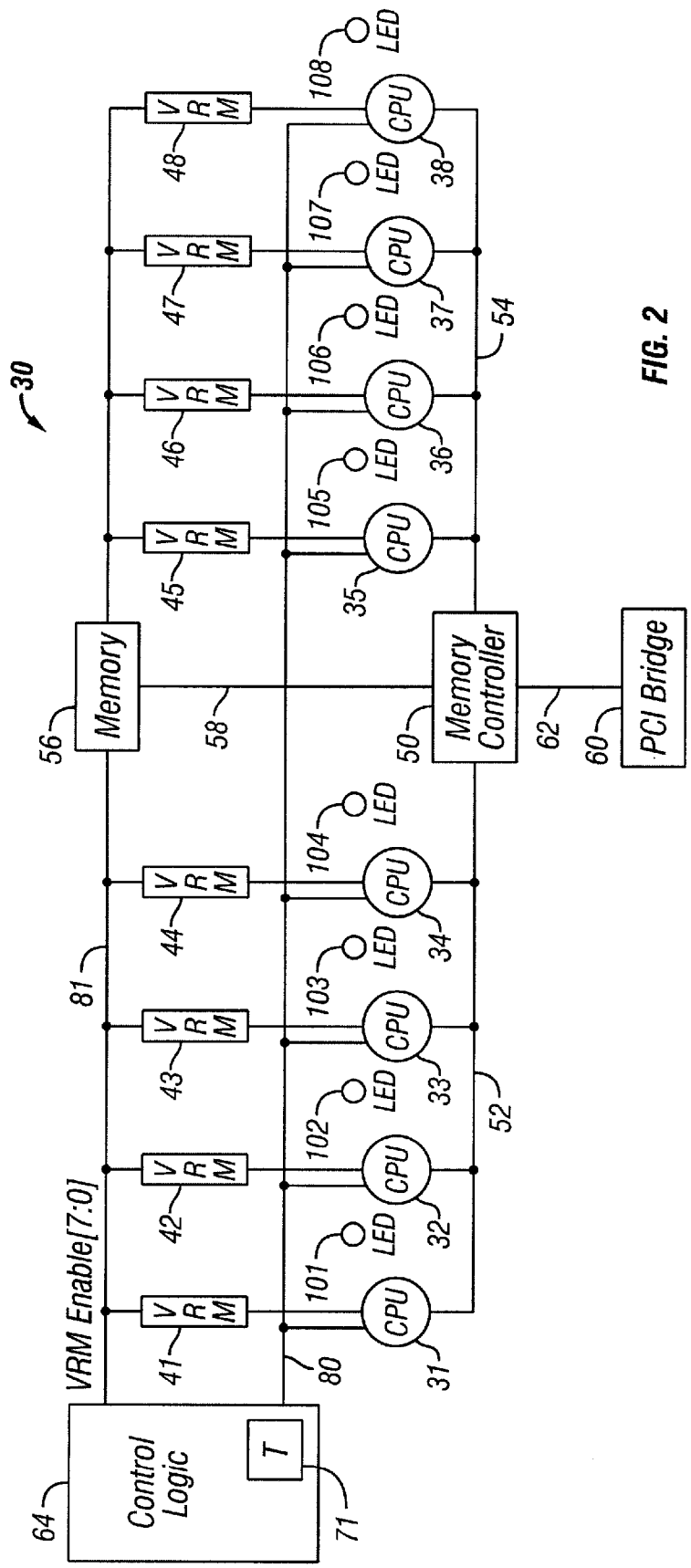
FIG. 2 illustrates a block diagram of a portion of one embodiment of a multiprocessor computer.

A block diagram of a multiprocessor personal computer, such as one that may be used in the system 10, is illustrated in FIG. 2 and generally designated by the reference numeral 30. In this embodiment, the computer 30 includes eight processors, or CPUs, 31, 32, 33, 34, 35, 36, 37, and 38, such as Pentium Pro or Pentium II Xeon processors. Each of the processors 31–38 is illustrated as being powered by its own dedicated voltage regulator module (VRM) 41, 42, 43, 44, 45, 46, 47, and 48, respectively. Of course, it should be understood that the number of processors used in the multiprocessor computer 30 and the manner in which these processors are powered is not crucial.

As in a conventional computer, each of the processors 31–38 are coupled to a memory controller 50 via a bus. Because the illustrated computer 30 is a split bus design, the processors 31–34 communicate with the memory controller 50 via a bus 52, and the processors 35–38 communicate with the memory controller 50 via a bus 54. However, it should be understood that the teachings set forth herein apply to other bus designs as well, such as a single bus design or multiple bus design like the EV6 bus used with the Alpha 21364 available from Digital Equipment Corporation which includes one processor per bus and as many buses as processors. The memory controller 50 communicates with a memory 56 via a bus 58 and with a PCI bridge 60 via a bus 62, as is known in the art. As described with reference to FIG. 1, the memory 56 may include, for instance, volatile memory and/or nonvolatile memory.

Unlike conventional computers, the computer 30 includes control logic 64 that can disable one or more of the processors 31–38 during the power up sequence in response to a processor failure. If one of the processors 31–38 is determined to have failed in some respect, the failed processor can be identified, it can be removed from the continued operation of the computer 30 without disrupting the operation of the other processors so that it may be subsequently removed from the computer or replaced, and/or the user or administrator of the computer 30 can be notified of the processor failure. Various exemplary methods and apparatus for implementing such a scheme are described below.

Figure 3:
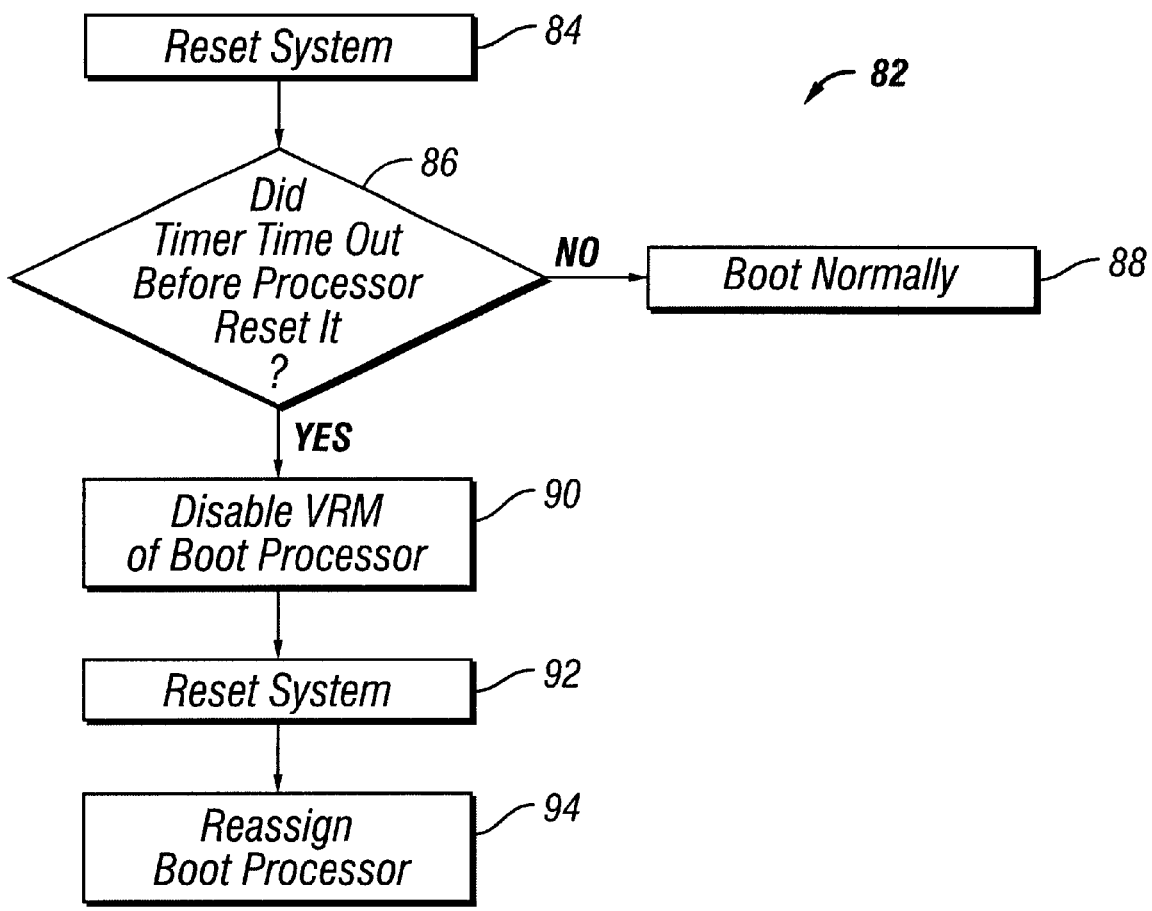
FIG. 3 illustrates a flow chart depicting the general operation of one embodiment of a processor disabling scheme for the multiprocessor computer of FIG. 2.

Referring now to FIG. 3 in addition to FIG. 2, a flowchart 82 illustrates an example of the scheme for disabling one or more of the processors 31–38. This scheme may be implemented wholly in software, so that it may be downloaded onto a suitable multiprocessor computer via disk, read only memory, or over the internet, for example, or it may be wholly or partially implemented in hardware as discussed subsequently.

In this example, the computer 30 includes a timer 71 associated with and operatively coupled to the processors 31–38 via a bus 80. The timer 71 may be part of the control logic 64. The control logic 64, in turn, is coupled to each of the VRMs 41–48 via a bus 81. As described in detail below, if the designated boot processor is operating correctly, it delivers a signal to the timer 71 via the bus 80 to stop the timer 71. However, if the designated boot processor is not operating correctly, the timer 71 times out and the control logic 64 receives a signal from the timer 71 indicating that the designated boot processor 31–38 has failed to boot the computer 30. In response, the control logic 64 disables the VRM associated with that processor to render the processor inoperable.

During a power up sequence, one of the processors 31–38 is initially designated as the boot processor. For the purposes of this example, the processor 31 is initially designated as the boot processor at the time of the initial system reset. (Block 84). At this time, the timer 71 begins counting, and the boot processor attempts to boot the computer 30. If the boot processor 31 is operating correctly, it stops the timer 71 before it times out, and it boots the computer normally. (Blocks 86 and 88). However, if the boot processor 31 fails to boot the computer 30 before the timer 71 times out, the timer 71 delivers a signal to the control logic 64. In response to the signal from the timer 71, the control logic 64 delivers a signal on the bus 81 to the VRM 41 associated with the processor 31 to disconnect the processor's supply voltage delivered by the VRM 41, thus disabling the processor 31. (Block 90). Then, the system resets and another boot processor is assigned from the remaining operable processors 32–38. (Blocks 92 and 94). This process repeats until an operable processor is able to boot the computer 30. (Blocks 86–94).

More specifically, when the computer 30 is turned on, a POWRGD (powergood) signal is asserted. The timer 71 starts counting, and the processor 31 attempts to boot in response to this signal. If the boot processor 31 is not operating correctly, it does not stop the timer, so the timer 71 times out. When it times out, the timer 71 delivers a signal to the control logic 64, which is advantageously implemented using a PAL. In response to the signal from the timer 71, the control logic 64 delivers a FLUSHEN# signal to the VRM41 which powers the processor 31. The VRM 41 receives the FLUSHEN# signal from the control logic 64 on its VCCP output enable (VCCPOE) pin, which is a standard pin on all Intel compliant VRMs. When VCCPOE is deasserted, the VRM 41 does not deliver a supply voltage to the processor 31, thus effectively removing the processor 31 from operation without affecting the other processors 32–38 and without relying on the failed processor 31 to sample its FLUSH# pin and render itself inoperable.

When the computer 30 resets, e.g., approximately two milliseconds later, another boot processor is chosen (since the previous boot processor 31 is now inoperable) and the timer 71 is restarted. For example, a boot processor may be chosen by virtue of its location. Using this scheme, the processor located in slot X will boot the computer 30 while the processors in slots Y will be dormant, where X is less than Y. While the processor 31 is located in the lowest numbered slot, and was thus chosen as the boot processor initially, the processor located in the next lowest numbered slot, i.e., processor 32, is now chosen as the boot processor due to the inoperability of the processor 31. As discussed previously, if the processor 32 can boot the computer 30, the computer boots normally with seven operable processors 32–38. However, if the processor 32 cannot boot the computer 30, the processor 32 is also disabled in the manner described above, and the process repeats until an operable boot processor is found.

As each processor 31–38 is disabled, the control logic 64 may also deliver a signal to the user or administrator of the computer 30 to indicate which processor has failed so that it may be subsequently removed or replaced. As illustrated in FIG. 2, the control logic 64 may illuminate an appropriate LED 101, 102, 103, 104, 105, 106, 107, or 108 associated with each respective processor 31–38 to indicate which processor has failed. Advantageously, the respective LEDs 101–108 are positioned on or near each processor 31–38 to help insure that the failed processor is readily identifiable to the user. Of course, a variety of other techniques, such as a graphical user interface (GUI), an LCD, or CRT message, may also be used. Also, a real time clock (not shown) advantageously may be used to provide an indication of the time the failure occurred.

The discussion thus far has referred to a computer 30 that uses VRMs to power its microprocessors. However, a disabling scheme may also be implemented in computers using older microprocessors, such as Intel's Pentium processor, that do not use VRMs to supply power to the microprocessors. In these computers, such as the computer 100 illustrated by way of example in FIG. 4., the computer's power supply supplies the necessary voltages to the computer's microprocessors.

In this embodiment, the computer 100 includes eight processors, or CPUs, 131, 132, 133, 134, 135, 136, 137, and 138. As in a conventional computer, each of the processors 131–138 are coupled to a memory controller 150 via a bus. Because the illustrated computer 100 is a split bus design, the processors 131-134 communicate with the memory controller 150 via a bus 152, and the processors 135–138 communicate with the memory controller 150 via a bus 154. However, it should be understood that the teachings set forth herein apply to other bus designs as well, such as a single bus design or multiple bus design like the EV6 bus used with the Alpha 21364 available from Digital Equipment Corporation which includes one processor per bus and as many buses as processors. The memory controller 150 communicates with a memory 156 via a bus 158 and with a PCI bridge 160 via a bus 162, as is known in the art. As described with reference to FIG. 1, the memory 156 may include, for instance, volatile memory and/or nonvolatile memory.

Unlike conventional computers, the computer 100 includes control logic 164 that disables one or more of the processors 131–138 during the power up sequence in response to a processor failure. If one of the processors 131–138 is determined to have failed in some respect, the failed processor can be identified, it can be removed from the continued operation of the computer 100 without disrupting the operation of the other processors so that it may be subsequently removed from the computer or replaced, and/or the user or administrator of the computer 100 can be notified of the processor failure.

However, unlike the embodiment of the computer 30 illustrated in FIG. 2, each of the processors 131–138 is illustrated as being powered by the computer's power supply 140. Specifically, a transistor 141, 142, 143, 144, 145, 146, 147, and 148, such as an n-channel FET, is source-to-drain coupled between the power supply 140 and each respective processor 131–138. The gate of each transistor 141–148 is coupled to the control logic 164 via a bus 181. As explained below, the transistors 141–148 may be switched off to disable the respective processors 131–138. However, it should be understood that various switches or power disabling devices may also be suitably used to disable the processors in the computer.

The computer 100 also includes a timer 171 associated with and operatively coupled to the processors 131–138 via the bus 180. The timer 171 may be part of the control logic 164. The control logic 164, in turn, is coupled to each of the transistors 141–148 via a bus 181. As described in detail below, if the designated boot processor is operating correctly, it delivers a signal to the timer 171 via the bus 180 to stop the timer 171. However, if the designated boot processor is not operating correctly, the timer 171 times out and the control logic 164 receives a signal from a timer 171–178 indicating that the associated processor 131–138 has failed to boot the computer 100. In response, the control logic 164 turns off the respective transistor 141–148 associated with that processor to render the processor inoperable.

Figure 4:
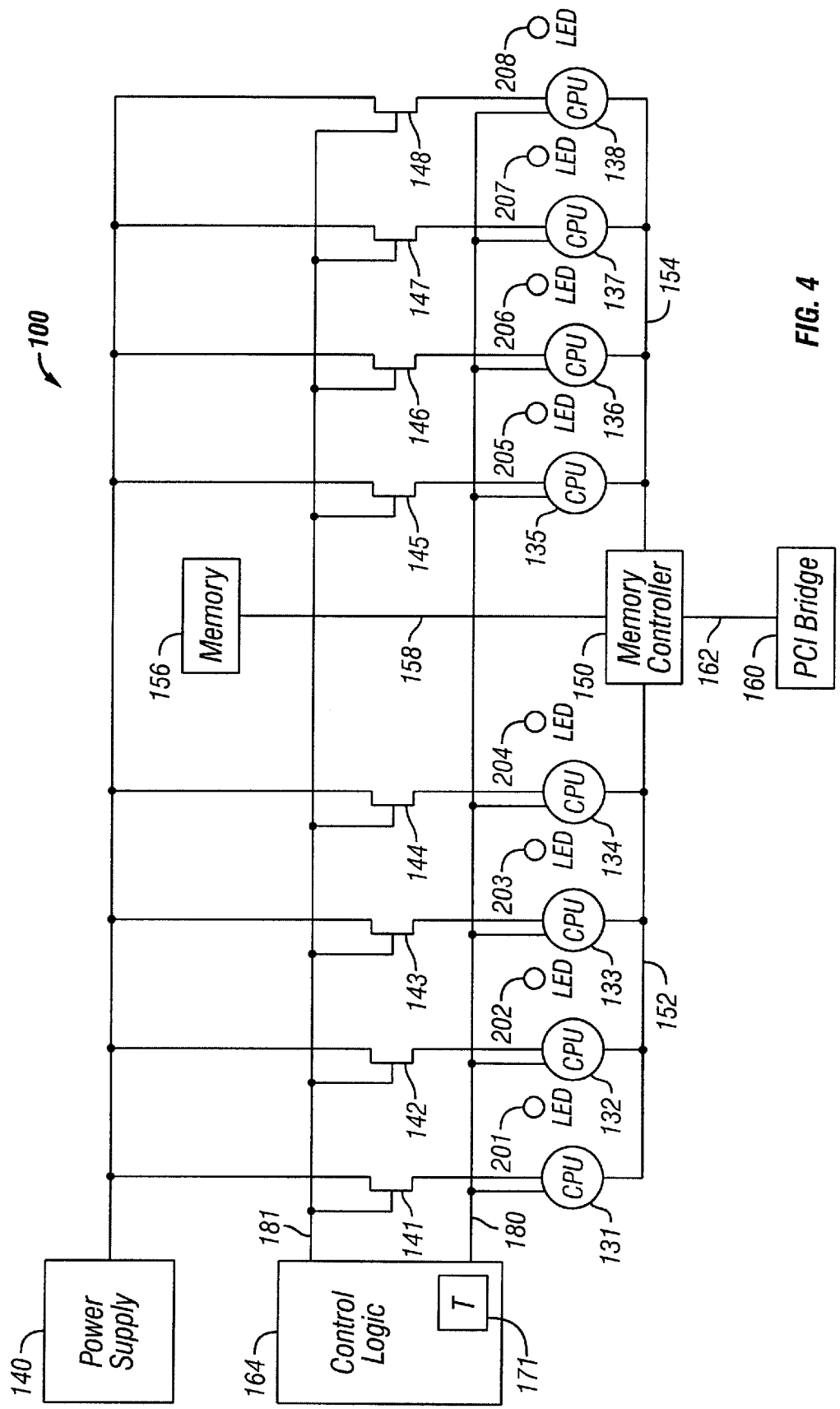
FIG. 4 illustrates a block diagram of a portion of another embodiment of a multiprocessor computer.
Figure 5:
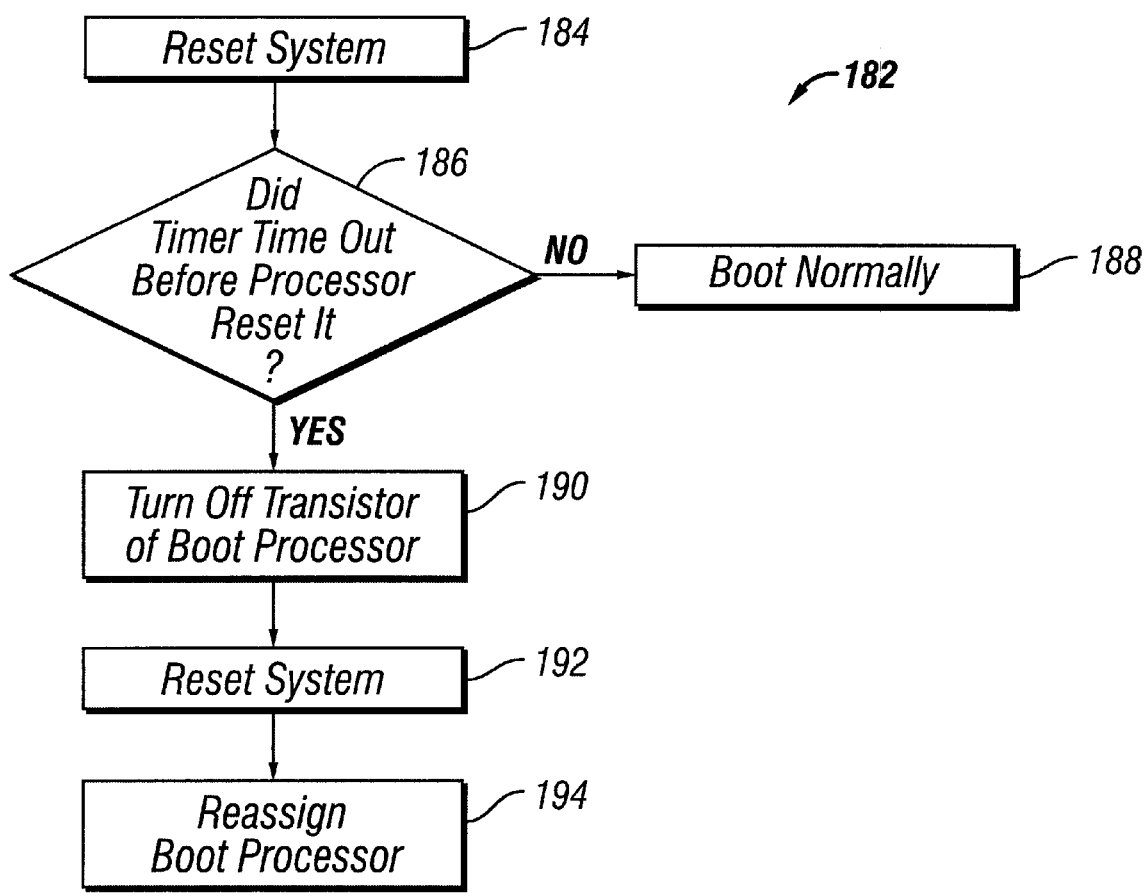
FIG. 5 illustrates a flow chart depicting the general operation of one embodiment of a processor disabling scheme for the multiprocessor computer of FIG. 4.

Referring now to FIG. 5 in addition to FIG. 4, a flowchart 182 illustrates an example of the scheme for disabling one or more of the processors 131–138. This scheme may be implemented wholly in software, so that it may be downloaded onto a suitable multiprocessor computer via disk, read only memory, or over the internet, for example, or it may be wholly or partially implemented in hardware as discussed subsequently.

During a power up sequence, one of the processors 131–138 is initially designated as the boot processor. For the purposes of this example, the processor 131 is initially designated as the boot processor at the time of the initial system reset. (Block 184). At this time, the timer 171 begins counting, and the boot processor attempts to boot the computer 100. If the boot processor 131 is operating correctly, it stops the timer 171 before it times out, and the computer boots normally. (Blocks 186 and 188). However, if the boot processor 131 fails to boot the computer 100 before the timer 171 times out, the timer 171 delivers a signal to the control logic 164. In response to the signal from the timer 171, the control logic 164 delivers a signal to the transistor 141 associated with the processor 131 to disconnect the supply voltage delivered by the power supply 140, thus disabling the processor 131. (Block 190). Then, the system resets and another boot processor is assigned from the remaining operable processors 132–138. (Blocks 192 and 194). This process repeats until an operable processor is able to boot the computer 100. (Blocks 186–194).

More specifically, when the computer 100 is turned on, a POWRGD signal is asserted. The timer 171 starts counting and the processor 131 attempts to boot in response to this signal. If the boot processor is not operating correctly, it does not stop the timer 171, so the timer 171 times out. When it times out, the timer 171 delivers a signal to the control logic 164, which is advantageously implemented using a PAL. In response to the signal from the timer 171, the control logic 164 delivers a logical 1 to the transistor 141 which routes power to the processor 131. When the transistor 141 receives this signal, it turns off so that it does not deliver the supply voltage to the processor 131, thus effectively removing the processor 131 from operation without affecting the other processors 132–138 and without relying on the failed processor 131 to sample its FLUSH# pin and render itself inoperable.

When the computer 100 resets, e.g., approximately two milliseconds later, another boot processor is chosen (since the previous boot processor 131 is now inoperable) and the timer 171 is restarted. For example, a boot processor may be chosen by virtue of its location. Using this scheme, the processor located in slot X will boot the computer 100 while the processors in slots Y will be dormant, where X is less than Y. While the processor 131 is located in the lowest numbered slot, and was thus chosen as the boot processor initially, the processor located in the next lowest numbered slot, i.e., processor 132, is now chosen as the boot processor due to the inoperability of the processor 131. As discussed previously, if the processor 132 can boot the computer 100, the computer boots normally with seven operable processors 132–138. However, if the processor 132 cannot boot the computer 100, the processor 132 is also disabled in the manner described above, and the process repeats until an operable boot processor is found.

As each processor 131–138 is disabled, the control logic 164 may also deliver a signal to the user or administrator of the computer 100 to indicate which processor has failed so that it may be subsequently removed or replaced. As illustrated in FIG. 4, the control logic 164 may illuminate an appropriate LED 201, 202, 203, 204, 205, 206, 207, or 208 associated with each respective processor 131–138 to indicate which processor has failed. Advantageously, the respective LEDs 201–208 are positioned on or near each processor 131–138 to help insure that the failed processor is readily identifiable to the user. Of course, a variety of other techniques, such as a graphical user interface (GUI), an LCD, or CRT message, may also be used. Also, a real time clock (not shown) advantageously may be used to provide an indication of the time the failure occurred.

It should be appreciated that consecutively disabling each processor as a result of a failed boot attempt may, in certain situations, disable a functional processor that cannot boot the computer due to the particular malfunction of another failing processor. Referring again to FIG. 2, for example, if the processor 33 failed and pulled a signal to 0 V when it was not supposed to be driving this signal, it may prevent any other processor from booting the computer 30. Using the scheme described above, the processors 31, 32, and 33 would be disabled before the processor 34 could boot the computer 30 as a result of the processor 33 finally being disabled. Thus, the computer 30 would begin operation without the services of two functional processors 31 and 32.

To optimize the number of operating processors, therefore, the control logic 64 may perform a number of tests in which various combinations of processors are disabled to isolate the cause of the booting problem. For the purposes of this discussion, it will be assumed that the computer 30 includes only four processors 31–34 rather than eight. With this assumption in mind, as set forth in the Table 1 below, the control logic 64 may execute sixteen boot attempts, with various processors 31–34 (1–4) disabled, in an effort to boot the computer 30 with as many functional processors 31–34 as possible.

TABLE 1

| Boot Attempt | Disabled Processors |
| --- | --- |
| 1 | None |
| 2 | Processor 1 |
| 3 | Processor 2 |
| 4 | Processor 3 |
| 5 | Processor 4 |
| 6 | Processor 1, 2 |
| 7 | Processor 1, 3 |
| 8 | Processor 1, 4 |
| 9 | Processor 2, 3 |
| 10 | Processor 2, 4 |
| 11 | Processor 3, 4 |
| 12 | Processor 1, 2, 3 |
| 13 | Processor 1, 2, 4 |
| 14 | Processor 1, 3, 4 |
| 15 | Processor 2, 3, 4 |
| 16 | Processor 1, 2, 3, 4 |

It should be understood that this scheme may be extrapolated for use with a computer having a different number of processes, as set forth in the Table 2 below.

TABLE 2

| Number of Processor | Number of Boot Attempts |
| --- | --- |
| 2 | 4 |
| 3 | 8 |
| 4 | 16 |
| 5 | 32 |
| 6 | 64 |
| 7 | 128 |
| 8 | 256 |

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of disabling a processor in a multiprocessor computer, the method comprising the acts of:

(a) designating a processor as a boot processor;

(b) attempting to boot the computer using the boot processor; and (c) disconnecting power to the boot processor by directing the voltage regulator module coupled to the boot processor to cease power delivery to the boot processor in response to the boot processor not booting the computer.

2. The method, as set forth in claim 1, wherein act (a) comprises the act of:

determining which powered processor resides in a lowest hierarchical slot and designating that powered processor as the boot processor.

3. The method, as set forth in claim 1, wherein act (b) comprises the act of:

triggering a timer associated with the boot processor to begin timing, the timer delivering a time out signal in response to a given period of time elapsing.

4. The method, as set forth in claim 3, wherein act (c) comprises the act of:

directing the voltage regulator module coupled to the boot processor to cease power delivery to the boot processor in response to the time out signal.

5. The method, as set forth in claim 1, wherein acts (a), (b), and (c) are repeated until one of the processors of the multiprocessor computer boots the computer.

6. A method of disabling a processor in a computer having a plurality of processors, the method comprising the acts of:

(a) designating one of the plurality of processors as a boot processor;

(b) attempting to boot the computer using the boot processor;

(c) disconnecting power to the boot processor by directing the voltage regulator module coupled to the boot processor to cease power delivery to the boot processor in response to the boot processor not booting the computer;

(d) designating one of the plurality of processors which has not been disabled as an alternative boot processor;

(e) attempting to boot the computer using the alternative boot processor;

(f) disconnecting power to the alternative boot processor by directing the voltage regulator module coupled to the alternative boot processor to cease power delivery to the alternative boot processor in response to the alternative boot processor not booting the computer; and (g) repeating acts (d), (e), and (f) until the alternative boot processor boots the computer.

7. The method, as set forth in claim 6, wherein acts (a) and (d) comprise the act of:

determining which powered processor resides in a lowest hierarchical slot and designating that powered processor as the boot processor.

8. The method, as set forth in claim 6, wherein acts (b) and (e) comprise the act of:

triggering a timer associated with the boot processor to begin timing, the timer delivering a time out signal in response to a given period of time elapsing.

9. The method, as set forth in claim 8, wherein act (c) comprises the act of:

directing the voltage regulator module coupled to the boot processor to cease power delivery to the boot processor in response to the time out signal.

10. The method, as set forth in claim 8, wherein act (f) comprises the act of:

directing the voltage regulator module coupled to the boot processor to cease power delivery to the alternative boot processor in response to the time out signal.

11. A tangible medium containing a software program for disabling a processor in a computer having a plurality of processors, the tangible medium comprising:

a routine for designating one of the plurality of processors as a boot processor;

a routine for disconnecting power to the boot processor by directing a voltage regulator module coupled to the boot processor to cease power delivery to the boot processor in response to the boot processor not booting the computer;

a routine for designating one of the plurality of processors which has not been disabled as an alternative boot processor; and a routine for disconnecting power to the alternative boot processor by directing the voltage regulator module coupled to the alternative boot processor to cease power delivery to the alternative boot processor in response to the alternative boot processor not booting the computer.

12. A computer comprising:

a plurality of microprocessors;

a like plurality of voltage regulator modules, each voltage regulator module being coupled to provide power to a respective one of the plurality of microprocessors;

a control device being coupled to the plurality of voltage regulator modules, the control device directing each voltage regulator module to cease power delivery to its associated microprocessor in response to the associated microprocessor failing to boot the computer; and a like plurality of timers, each timer being coupled to a respective one of the plurality of microprocessors;

wherein the timer associated with a respective one of the plurality of microprocessors begins timing when the respective one of the plurality of microprocessors is designated to boot the computer, the timer delivering a time out signal to the control device in response to a given period of time elapsing before the computer boots; and wherein the control device directs the voltage regulator module associated with the respective one of the plurality of microprocessors to cease power delivery in response to receiving the time out signal from the timer associated with the respective one of the plurality of microprocessors.

13. The computer, as set forth in claim 12, comprising a plurality of timers, each timer being coupled to a respective one of the plurality of microprocessors.

14. The computer, as set forth in claim 13, wherein the timer associated with a respective one of the plurality of microprocessors begins timing when the respective one of the plurality of microprocessors is designated to boot the computer, the timer delivering a time out signal to the control device in response to a given period of time elapsing before the computer boots.

15. A computer comprising:

a power supply;

a plurality of microprocessors;

a like plurality of transistors, each transistor being coupled to the power supply and to a respective one of the plurality of microprocessors to supply power to the respective one of the plurality of microprocessors when turned on; and a control device being coupled to the plurality of transistors, the control device turning off each transistor to cease power delivery to its associated microprocessor in response to the associated microprocessor failing to boot the computer.

16. The computer, as set forth in claim 15, comprising a like plurality of timers, each timer being coupled to a respective one of the plurality of microprocessors.

17. The computer, as set forth in claim 16, wherein the timer associated with a respective one of the plurality of microprocessors begins timing when the respective one of the plurality of microprocessors is designated to boot the computer, the timer delivering a time out signal to the control device in response to a given period of time elapsing before the computer boots.

18. The computer, as set forth in claim 17, wherein the control device turns off the transistor associated with the respective one of the plurality of microprocessors to cease power delivery in response to receiving the time out signal from the timer associated with the respective one of the plurality of microprocessors.

19. A method of disabling a processor in a multiprocessor computer, the method comprising the acts of:

(a) designating a processor as a boot processor;

(b) attempting to boot the computer using the boot processor; and (c) disconnecting power to the boot processor by turning off a transistor coupled between a power supply and the boot processor to cease power delivery to the boot processor in response to the boot processor not booting the computer.

20. The method, as set forth in claim 19, wherein act (b) comprises the act of:

triggering a timer associated with the boot processor to begin timing, the timer delivering a time out signal in response to a given period of time elapsing.

21. The method, as set forth in claim 20, wherein act (c) comprises the act of:

turning off the transistor coupled between the power supply and the boot processor to cease power delivery to the boot processor in response to the time out signal.

22. A method of disabling a processor in a computer having a plurality of processors, the method comprising the acts of:

(a) designating one of the plurality of processors as a boot processor;

(b) attempting to boot the computer using the boot processor;

(c) disconnecting power to the boot processor by turning off a transistor coupled between a power supply and the boot processor to cease power delivery to the boot processor in response to the boot processor not booting the computer;

(d) designating one of the plurality of processors which has not been disabled as an alternative boot processor;

(e) attempting to boot the computer using the alternative boot processor;

(f) disconnecting power to the alternative boot processor by turning off a transistor coupled between a power supply and the alternative boot processor to cease power delivery to the alternative boot processor in response to the alternative boot processor not booting the computer; and (g) repeating acts (d), (e), and (f) until the alternative boot processor boots the computer.

23. The method, as set forth in claim 22, wherein act (b) comprises the act of:

triggering a timer associated with the boot processor to begin timing, the timer delivering a time out signal in response to a given period of time elapsing.

24. The method, as set forth in claim 23, wherein act (c) comprises the act of:

turning off a transistor coupled between a power supply and the boot processor to cease power delivery to the boot processor in response to the time out signal.

25. The method, as set forth in claim 23, wherein act (f) comprises the act of:

turning off a transistor coupled between a power supply and the alternative boot processor to cease power delivery to the alternative boot processor in response to the time out signal.

* * * * *